United States Patent

[11] 3,586,115

| [72] | Inventors | Lester A. Amtsberg<br>Utica;<br>William K. Wallace, Barneveld, both of, N.Y. |
|---|---|---|
| [21] | Appl. No. | 872,166 |
| [22] | Filed | Oct. 29, 1969 |
| [45] | Patented | June 22, 1971 |
| [73] | Assignee | Chicago Pneumatic Tool Company<br>New York, N.Y. |

[54] TWO-SPEED DUAL DRIVE STALL TORQUE NUT RUNNING TOOL
6 Claims, 2 Drawing Figs.

[52] U.S. Cl. ................................................ 173/163,
    81/52.4, 81/57.14, 173/12
[51] Int. Cl. ........................................... B25b 23/14
[50] Field of Search ........................................... 173/12,
    163; 81/57.14, 52.4

[56] References Cited
UNITED STATES PATENTS

| 3,354,754 | 11/1967 | Amtsberg et al. | 81/52.4 |
| 3,507,173 | 4/1970 | Wallace | 81/52.4 |

*Primary Examiner*—Ernest R. Purser
*Attorney*—Stephen J. Rudy

ABSTRACT: A two-speed nut running tool having two separate air motors, one serving as a rundown motor; and the other as a torquing motor. Both motors are connected to a common output spindle through a common planetary gear system. The arrangement is such that the rundown motor drives the output spindle through a small gear reduction; and the torquing motor drives the spindle through a larger gear reduction. The motors operate concurrently in the same direction to drive the spindle. The rundown motor provides an initial tightness to the work determined by the limits of its capacity and then stalls. The concurrently running torquing motor thereafter continues to tighten the work through the gear system. When a reactionary torque develops through the gear system tending to rotate the rundown motor in a reverse direction from its stalled condition, a one-way clutch responds to this action to restrain such reverse rotation. This enables the torquing motor to continue its torque delivery to the work until it has reached the limit of its capacity and stalls. The stall torque capacity of the torquing motor represents the maximum value of final torque delivered to the work.

PATENTED JUN22 1971　　　　　　　　　　3,586,115
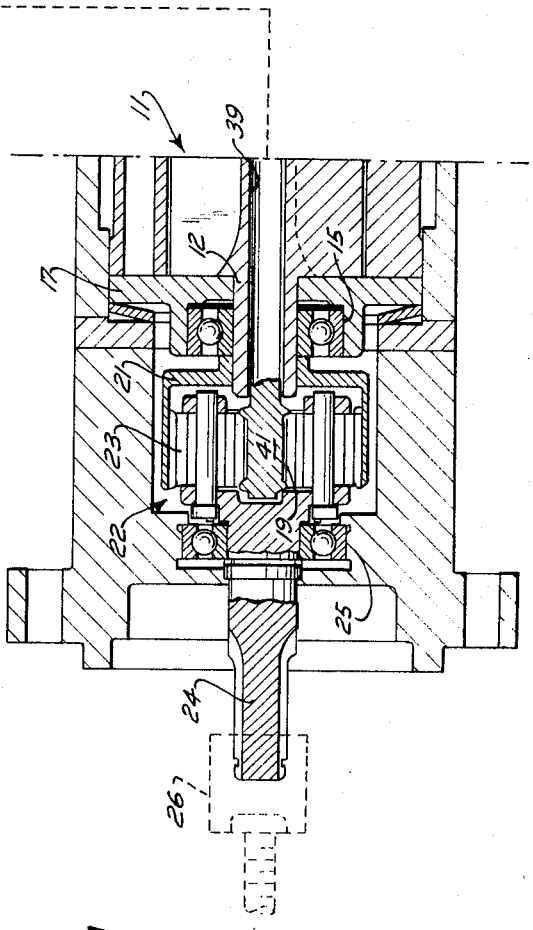
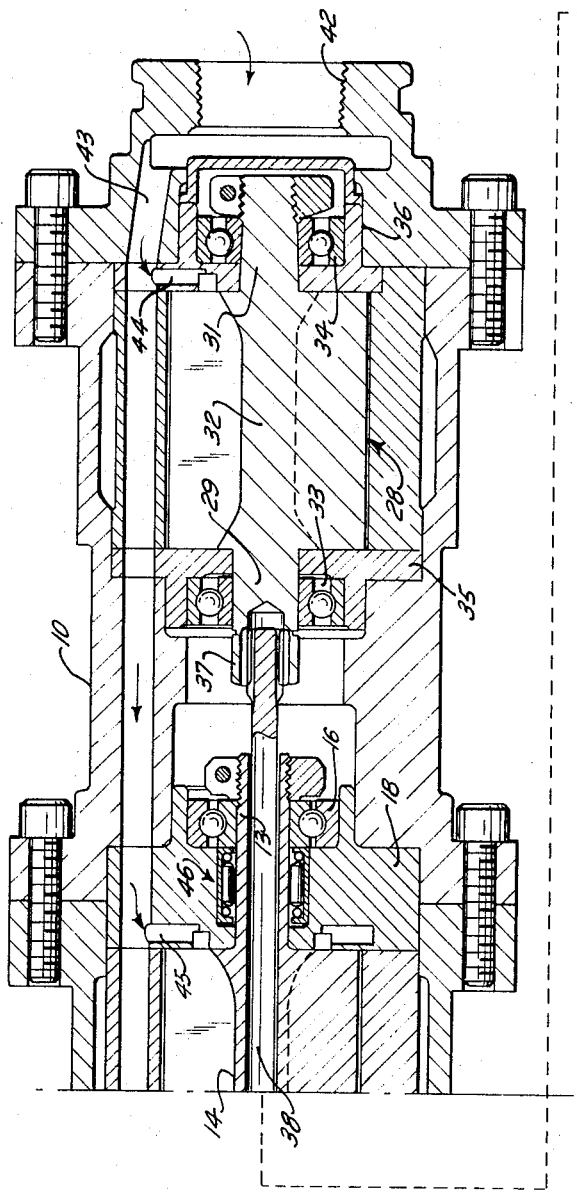
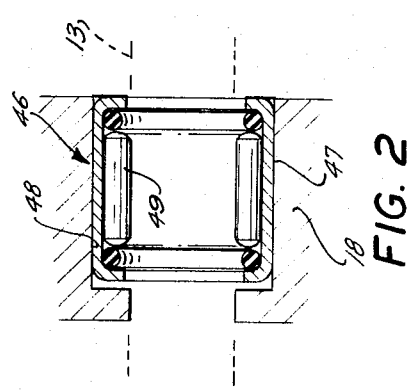
FIG. 1
FIG. 2
INVENTORS
LESTER A. AMTSBERG
WILLIAM K. WALLACE
BY
Stephen J. Rudy
ATTORNEY

TWO-SPEED DUAL DRIVE STALL TORQUE NUT RUNNING TOOL

BACKGROUND OF THE INVENTION

This invention is concerned with a two-speed nut running tool having a pair of air motors operating separately and concurrently in the same direction to drive the work through common dual drive planetary gearing, in which arrangement one of the motors drives the work through a small gear reduction and the other drives the work through a larger gear reduction.

A nut running tool of this general nature is known from a pending patent application of one of the inventors herein, Ser. No. 746,099 filed July 19, 1968 and now U.S. Pat. No. 3,507,173. In this known tool, an initial torque is applied to the work by a rundown motor; and a final torque is applied by a torquing motor, but this final torque does not represent the stall torque capacity of the torquing motor.

An object of this invention is to provide a two-speed dual drive nut running tool using a pair of separate air motors in an arrangement in which one of the motors serves to initially run down the work; and the other motor serves to apply a final torque value to the work determined by its stall torque capacity.

A more particular object of this invention is to provide in a two-speed dual drive nut running tool an arrangement of a pair of separate air motors operating through planetary gearing to drive a common output spindle connected with the work, wherein one of the motors drives the spindle through a small gear reduction to initially run down the work until it reaches the limit of its capacity and stalls; and the other motor operating concurrently drives the spindle through a larger gear reduction to finally tighten the work to the limit of its capacity and then stalls.

A particular advantage of the invention is that a precise torque is delivered by the tool in each work operation. The stall torque capacity of the torquing motor is the maximum value of final torque applied to the work. No complex control devices are required to be incorporated in the tool to obtain the desired final torque. If variation in the torque delivery is desired, it may be taken care of by providing appropriate reduction gearing in the gear train drive, or by varying the pressure of the air supply.

BRIEF DESCRIPTION OF THE DRAWING

In the accompanying drawing:

FIG. 1 is a longitudinal section through a pneumatically powered dual drive nut running tool embodying the invention; and FIG. 2 is a detail in section of the clutch and of a portion of the associated stationary end plate.

DESCRIPTION OF PREFERRED EMBODIMENT

In the accompanying drawing is disclosed a dual drive nut running tool having an elongated housing 10 defined by a succession of sections rigidly connected to one another in end-to-end relation.

Supported in a forward section of the housing is an air-driven main or rundown motor 11 of a conventional radially slidable vane type. The shaft ends 12 and 13 of its rotor 14 are supported in bearings 15 and 16 mounted in motor end plates 17 and 18. The end plates are stationary or rigid with the housing. The forward shaft end 12 has a splined driving connection with a rotatable ring gear member 21 of a dual drive reduction gear system 22. The ring gear is drivingly engaged with idler or planet gears 23 carried by an output spindle 24. The latter is supported by a housing bearing 25. The spindle 24 is connectable by means of a terminal socket 26 with the work, such as a bolt, nut or other threaded fastener. Additional reduction gearing (not shown) may be interposed between the spindle and the socket.

The function of the main motor is to rapidly run down and tighten the work to the limit of its capacity and then stall. This initial degree of tightness is less than the torque required to bring the work to a final predetermined degree of tightness. An auxiliary or torquing motor 28 is supported in a rear section of the housing in axial alignment with the main motor. Its purpose is to continue, after the main motor has stalled, to increase the torque delivery to the work to a final degree of tightness. Final torque delivery will be completed when the auxiliary motor reaches the limits of its capacity and stalls.

The auxiliary motor is also an air-driven motor of a conventional radially slidable vane type. The shaft ends 29 and 31 of its rotor 32 are supported in bearings 33 and 34 mounted in stationary motor end plates 35 and 36. The auxiliary motor is designed to also transmit its torque through the dual drive gearing 22 to the output spindle 24. To this end, its forward shaft end 29 has a splined driving connection 37 with an elongated torque transmitting shaft 38. The latter extends through an axial bore 39 of the main rotor; and it has a pinion or sun gear 41 formed upon a forwardly projecting end in driving engagement at 19 with the planet gears 23. The long shaft 38 is rotatable relative to the rotor 14 of the main motor. It is understood that reduction gearing may, if desired, be connected between the auxiliary motor 28 and shaft 38.

Live air is supplied to the tool from an external source at a constant pressure through an inlet 42 which connects with an air feed passage 43 in the wall of the housing. Passage 43 is common to both motors; it connects by means of a lateral passage 44 with the rotor chamber of the auxiliary motor, and by means of a lateral passage 45 with the rotor chamber of the main motor. Upon application of source air to the inlet 42, both motors are caused to be separately operated in the same direction and to run concurrently.

A conventional one-way clutch 46 (FIGS. 1, 2) of the freewheeling or overrunning type is arranged between the rotor shaft 13 of the main motor and the stationary end plate 18. The clutch allows rotation or freewheeling of the main motor in a forward or positive direction relative to the stationary plate, but restrains it against rotation in a reverse direction. The clutch includes an annular casing 47 disposed in a recess 48 of the stationary end plate 18 in surrounding coaxial relation to the rotor shaft end 13. The casing is fixed in the recess so as to be rigid with the end plate 18. The casing includes a ring of clutch rollers 49 which contact the surface of the rotor shaft 13. The clutch arrangement is such that, when the rotor shaft 13 is rotated in a forward direction, the rollers are caused by the shaft to roll freely in the casing. But when a torque force is imparted to the rotor shaft 13 in a reverse direction, the rollers are caused by the shaft to frictionally lock the stationary clutch casing with the shaft so as to restrain reverse rotation of the latter.

In summary of the operation of the tool, after the socket 26 has been engaged with the work, live air fed through the inlet 42 causes both motors to operate separately and concurrently in a forward direction. In this action, the main motor 11 freewheels by means of the clutch 46 relative to the stationary end plate 18. During this concurrent motor operation, the faster running main motor acts through the dual drive gearing 22 to rapidly run down and tighten the work until the main motor has reached the limit of its torque capacity and stalls. This initial torque delivery is less than the final torque required to tighten the work. The ring gear 21 will then be held stationary by the stalled motor. The auxiliary motor 28, which has been running concurrently with and at a slower speed than the main motor, continues to run after the latter has stalled and delivers increased torque through the planet gears of the dual drive gearing to the output spindle. When the capacity of the main motor to hold the ring gear stationary is exceeded by the torque being transmitted to the work by the auxiliary motor, a resultant torque reaction forces the main motor in a reverse direction. In response to a slight initial reverse rotation of the main motor, the clutch rollers 49 act to lock the main rotor shaft 13 with the stationary end plate 18 so as to restrain further reverse rotation of the main motor. This enables the auxiliary motor to continue delivery of its torque through the dual drive gearing to the work. The auxiliary motor, accordingly, continues operating in a positive direction to increase the torque delivery to the work until the auxiliary motor has reached the limit of its capacity, at which time it will stall. The work will have received a final and predetermined degree of tightness when the auxiliary motor has stalled. The operator may then shut off the air supply to the tool. Suitable control mechanism (not shown) may be connected so as to respond to the stalling of the auxiliary motor to automatically shut off the air supply.

What we claim is:

1. A two-speed dual drive stall torque nut running tool comprising a planetary gear system having an output spindle, a rundown air vane motor having a small gear reduction drive connection through the gear system with the spindle, a torquing motor separate from the rundown motor having a larger gear reduction drive connection through the gear system with the spindle, air feed means for causing pneumatic operation of both motors separately and concurrently in the same direction, and clutch means that is responsive to reactionary torque transmitted through the gear system back to the rundown motor to restrain the rundown motor against being rotated in a reverse direction by the gear system without interrupting continued operation of the torquing motor.

2. A two-speed dual drive stall torque nut running tool including an air vane rundown motor carrying a ring gear by means of which it is drivingly engaged to planet gears of a planetary gear system carried by an output spindle, which planet gears are also drivingly engaged centrally of the gear system by a sun gear carried by a torquing air vane motor, there being a live air feed passage common to both motors so as to cause them to operate separately and concurrently in the same direction; wherein a one way overrunning clutch means is arranged between the rotor of the rundown motor and a plate stationary with the housing, the clutch means being responsive to forward torque transmitted to the rundown motor to allow free running of the latter motor in a forward direction and being responsive to reverse torque transmitted to the rundown motor to engage the latter with the stationary plate so as to restrain the rotor of the latter motor against reverse rotation.

3. A two-speed dual drive stall torque nut running tool as in claim 2, wherein the motors are axially aligned with one another, the rundown motor having a forward rotor shaft end upon which the ring gear is carried and having an axial bore through which a drive shaft carrying the sun gear extends, the drive shaft being driven by the torquing motor and having rotation relative to the rundown motor.

4. A two-speed dual drive stall torque nut running tool as in claim 2, wherein the rotor of the rundown motor has a rear rotor shaft end projecting into a recess formed in the stationary plate, the clutch means has a clutch casing fixed in the recess, and the casing contains a ring of clutch roller elements in surrounding contacting relation with the rear rotor shaft end, the rollers being adapted to rotate freely upon the rear rotor shaft end in response to forward rotation of the latter and being adapted to lock the rear rotor shaft end with the casing in response to a reverse torque being applied to the rear rotor shaft end.

5. A two-speed dual drive stall torque nut running tool having a rundown air vane motor carrying a ring gear which drivingly engages planet gears carried by an output spindle, which motor is pneumatically operable concurrently and in the same direction with a torquing air vane motor carrying a sun gear which drivingly engages the planet gears; wherein a one-way overrunning clutch is arranged between the rotor of the rundown motor and a member stationary with the housing of the tool, the clutch being adapted to allow forward rotation of the rundown motor and being responsive to reverse torque transmitted to the latter motor by the sun gear through the planet gears to the ring gear to restrain the rundown motor to the stationary member against relative reverse rotation so as to permit the torquing motor to deliver its torque through the sun gear and planet gears to the output spindle.

6. In a two-speed dual drive stall torque nut running tool containing a pair of air vane motors operating concurrently and separately in the same direction through common planetary gearing to drive a common work spindle, wherein a first one of the motors having a small gear reduction connection through the gearing with the spindle is adapted to stall upon the gearing upon reaching the limit of its torque capacity and a second one of the motors is adapted after such stalling action to continue torque delivery through the gearing until the extent of its torque capacity is reached; clutch means arranged between the rotor of the first motor and a member stationary with the housing of the tool having response to forwardly applied torque to the rotor of the first motor to allow forward rotation of the latter and having response to reactionary torque applied through the planetary gearing to the rotor of the first motor while the latter is stalled to engage the said rotor with the stationary member so as to restrain reverse rotation of the said rotor and to enable the second motor to continue delivery of its torque through the gearing to the work to the limit of its torque capacity.